(12) United States Patent
Kim et al.

(10) Patent No.: US 10,423,860 B1
(45) Date of Patent: *Sep. 24, 2019

(54) LEARNING METHOD AND LEARNING DEVICE FOR OBJECT DETECTOR BASED ON CNN TO BE USED FOR MULTI-CAMERA OR SURROUND VIEW MONITORING USING IMAGE CONCATENATION AND TARGET OBJECT MERGING NETWORK, AND TESTING METHOD AND TESTING DEVICE USING THE SAME

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,522

(22) Filed: Jan. 22, 2019

(51) Int. Cl.
*G06K 9/46* (2006.01)
*G06K 9/62* (2006.01)
(Continued)

(52) U.S. Cl.
CPC ......... *G06K 9/6257* (2013.01); *G06K 9/4642* (2013.01); *G06K 9/6262* (2013.01);
(Continued)

(58) Field of Classification Search
CPC .. G06K 9/6257; G06K 9/4642; G06K 9/6262; G06N 3/04; G06N 7/005
See application file for complete search history.

(56) References Cited

U.S. PATENT DOCUMENTS 10,169,679 B1 * 1/2019 Kim ................... G06K 9/6256
10,185,878 B2 * 1/2019 Liu .................... G06K 9/00369
(Continued)

OTHER PUBLICATIONS

Liu, J. , Wang, D. , Lu, L. , Wei, Z. , Kim, L. , Turkbey, E. B., Sahiner, B. , Petrick, N. A. and Summers, R. M. (2017), Detection and diagnosis of colitis on computed tomography using deep convolutional neural networks. Med. Phys., 44: 4630-4642. doi:10.1002/mp.12399 (Year: 2017).*
(Continued)

*Primary Examiner* — Utpal D Shah
(74) *Attorney, Agent, or Firm* — Husch Blackwell LLP

(57) ABSTRACT

A method for learning parameters of an object detector based on a CNN adaptable to customers' requirements such as KPI by using an image concatenation and a target object merging network is provided. The CNN can be redesigned when scales of objects change as a focal length or a resolution changes depending on the KPI. The method includes steps of: a learning device instructing an image-manipulating network to generate n manipulated images; instructing an RPN to generate first to n-th object proposals respectively in the manipulated images, and instructing an FC layer to generate first to n-th object detection information; and instructing the target object merging network to merge the object proposals and merge the object detection information. In this method, the object proposals can be
(Continued)

generated by using lidar. The method can be useful for multi-camera, SVM(surround view monitor), and the like, as accuracy of 2D bounding boxes improves.

28 Claims, 7 Drawing Sheets
(2 of 7 Drawing Sheet(s) Filed in Color)

(51) Int. Cl.
    *G06N 3/04* (2006.01)
    *G06N 7/00* (2006.01)
    *H04N 7/18* (2006.01)

(52) U.S. Cl.
    CPC ............... *G06N 3/04* (2013.01); *G06N 7/005* (2013.01); *H04N 7/181* (2013.01)

(56) References Cited

U.S. PATENT DOCUMENTS

| | | | | |
|---|---|---|---|---|
| 2016/0035078 | A1* | 2/2016 | Lin | G06T 7/0002 |
| | | | | 382/157 |
| 2017/0124415 | A1* | 5/2017 | Choi | G06N 3/08 |
| 2017/0147905 | A1* | 5/2017 | Huang | G06K 9/6232 |
| 2017/0220904 | A1* | 8/2017 | Bai | G06K 9/4604 |
| 2018/0039853 | A1* | 2/2018 | Liu | G06N 3/0454 |
| 2018/0039864 | A1* | 2/2018 | Yao | G06K 9/38 |
| 2018/0068198 | A1* | 3/2018 | Savvides | G06K 9/3233 |
| 2018/0096457 | A1* | 4/2018 | Savvides | G06K 9/6267 |
| 2018/0129906 | A1* | 5/2018 | Habibian | G06K 9/4628 |
| 2018/0137350 | A1* | 5/2018 | Such | G06K 9/00463 |
| 2018/0158189 | A1* | 6/2018 | Yedla | G06T 7/11 |
| 2018/0165551 | A1* | 6/2018 | Roh | G06K 9/3233 |
| 2018/0195977 | A1* | 7/2018 | Wang | G01V 5/0016 |
| 2018/0253622 | A1* | 9/2018 | Chen | G06K 9/4671 |
| 2018/0260414 | A1* | 9/2018 | Gordo Soldevila | |
| | | | | G06N 3/0445 |
| 2018/0260415 | A1* | 9/2018 | Gordo Soldevila | |
| | | | | G06K 9/4628 |
| 2018/0276454 | A1* | 9/2018 | Han | G06K 9/00255 |
| 2018/0315154 | A1* | 11/2018 | Park | G06T 1/20 |
| 2019/0012802 | A1* | 1/2019 | Liu | G06T 7/73 |
| 2019/0019037 | A1* | 1/2019 | Kadav | G06K 9/00744 |
| 2019/0050694 | A1* | 2/2019 | Fukagai | G06K 9/66 |
| 2019/0050728 | A1* | 2/2019 | Sim | G06N 3/08 |
| 2019/0050994 | A1* | 2/2019 | Fukagai | G06T 7/20 |
| 2019/0057507 | A1* | 2/2019 | El-Khamy | G06T 7/11 |
| 2019/0065897 | A1* | 2/2019 | Li | G06K 9/628 |

OTHER PUBLICATIONS

"Faster R-CNN: Towards Real-Time Object Detection with Region Proposal Networks", Ren, Shaoqing and He, Kaiming and Girshick, Ross and Sun, Jian, Advances in Neural Information Processing Systems 28, pp. 91-99, 2015. (Year: 2015).*

Xudong Sun, Pengcheng Wu, Steven C.H. Hoi, "Face detection using deep learning: An improved faster RCNN approach", Neurocomputing, vol. 299, 2018, pp. 42-50 (Year: 2018).*

Girshick, Ross, "Fast R-CNN", The IEEE International Conference on Computer Vision (ICCV), 2015. (Year: 2015).*

* cited by examiner

LEARNING METHOD AND LEARNING DEVICE FOR OBJECT DETECTOR BASED ON CNN TO BE USED FOR MULTI-CAMERA OR SURROUND VIEW MONITORING USING IMAGE CONCATENATION AND TARGET OBJECT MERGING NETWORK, AND TESTING METHOD AND TESTING DEVICE USING THE SAME

FIELD OF THE DISCLOSURE

The present disclosure relates to a method for learning parameters of an object detector based on a CNN to be used for multi-camera or surround view monitoring using an image concatenation and a target object merging network; and more particularly to the method for learning the parameters of the object detector based on the CNN using the image concatenation and the target object merging network, including steps of: (a) if at least one training image is acquired, (i) instructing a target region estimating network to search for a first target region to an n-th target region on the training image or its one or more resized images, wherein one or more corresponding target objects are estimated as located on each of the first target region to the n-th target region, (ii) instructing an image-manipulating network to generate a first manipulated image to an n-th manipulated image, each of which corresponds to each of the first target region to the n-th target region, from the training image or its resized images, and (iii) generating an integrated training image by concatenating the first manipulated image to the n-th manipulated image; (b) (i) instructing one or more convolutional layers to generate at least one integrated feature map by applying one or more convolution operations to the integrated training image, (ii) instructing an RPN to generate each of first object proposals to n-th object proposals, corresponding to the target objects, in each of the first manipulated image to the n-th manipulated image, by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the target objects; and (c) (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses, and a learning device, a testing method, and a testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

A CNN-based object detector may (i) instruct one or more convolutional layers to apply convolution operations to an input image, to thereby generate a feature map corresponding to the input image, (ii) instruct an RPN (Region Proposal Network) to identify proposals corresponding to an object in the input image by using the feature map, (iii) instruct a pooling layer to apply at least one pooling operation to areas on the feature map corresponding to the identified proposals, to thereby generate one or more pooled feature maps, and (iv) instruct an FC (Fully Connected) layer to apply at least one fully connected operation to the acquired pooled feature maps to output class information and regression information for the object, to thereby detect the object on the input image.

However, since the CNN-based object detector uses the feature map whose size is reduced from a size of the input image by the convolutional layers, although large-sized objects in the input image can be easily detected, it is difficult to detect a small-sized object in the input image.

That is, if there are multiple target regions corresponding to one or more objects as subjects to be detected in the input image, desired features may not be extracted accurately from some of target regions due to sizes thereof, and as a result, certain objects cannot be detected.

Such a problem may be resolved by object detection via cropping each of the target regions in each of the images included in an image pyramid derived from the input image, but in this case, the object detection must be performed for each of the cropped images corresponding to the target regions, thus computational load may increase.

In addition to this, a CNN operation is a block operation, e.g., an operation by a unit of 32, 64, 128, etc., for fast calculation, but if an input image whose width or height is not a multiple of the unit is acquired, one or more padding regions must be added to make it a multiple of the unit, but this becomes a burden to the CNN operation. As a result, the more there are cropped images whose width or height that is not a multiple of the unit, the heavier the burden on the CNN, which slows down the calculation speed of the CNN.

Accordingly, the inventors of the present disclosure propose a learning method, a learning device for efficiently detecting objects and reducing computational time of the CNN, by using the target regions corresponding to the objects with various sizes in the input image, and a testing method and a testing device using the same.

SUMMARY OF THE DISCLOSURE

It is an object of the present disclosure to solve all the aforementioned problems.

It is another object of the present disclosure to provide an object detector based on a CNN capable of efficiently detecting objects in an image without regard to their sizes.

It is still another object of the present disclosure to provide the object detector based on the CNN capable of detecting the objects on the image without additional computational load.

It is still yet another object of the present disclosure to provide the object detector based on the CNN capable of efficiently detecting the objects and reducing computational time of the CNN, by using target regions corresponding to the objects with various sizes in the input image.

In accordance with one aspect of the present disclosure, there is provided a method for learning parameters of an object detector based on a CNN using an image concatenation and a target object merging network, including steps of: (a) a learning device, if at least one training image is acquired, (i) instructing a target region estimating network to search for a first target region to an n-th target region on the training image or its one or more resized images, wherein one or more corresponding target objects are estimated as located on each of the first target region to the n-th target region, (ii) instructing an image-manipulating network to generate a first manipulated image to an n-th manipulated image, each of which corresponds to each of the first target region to the n-th target region, from the training image or its resized images, and (iii) generating an integrated training image by concatenating the first manipulated image to the n-th manipulated image; (b) the learning device (i) instructing one or more convolutional layers to generate at least one integrated feature map by applying one or more convolution operations to the integrated training image, (ii) instructing an RPN to generate each of first object proposals to n-th object proposals, corresponding to the target objects, in each of the first manipulated image to the n-th manipulated image, by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the target objects; and (c) the learning device (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

As one example, at the step of (c), the learning device instructs an RPN loss layer to calculate one or more RPN losses by referring to the merged object proposals and their corresponding GTs, to thereby learn parameters of the RPN by backpropagating the RPN losses.

As one example, at the step of (a), the learning device instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

As one example, the learning device instructs the image-manipulating network to add at least one zero padding region in-between each pair comprised of two neighboring adjusted manipulated images which are concatenated, among the first adjusted manipulated image to the n-th adjusted manipulated image.

As one example, the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as S×(K−1)/2.

As one example, at the step of (c), supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the learning device instructs the target object merging network to determine whether an IOU between the first specific object proposal and the second specific object proposal is equal to or greater than a first threshold, then (I) if the IOU is determined as less than the first threshold, calculates an adjusted IOU between an area, corresponding to the first specific object proposal, on the second specific manipulated image and an area, corresponding to the second specific object proposal, on the first specific manipulated image, and (II) if the adjusted IOU is determined as equal to or greater than a second threshold, selects (i) one of a higher probability among the first specific object proposal and the second specific object proposal, or (ii) one of a larger area calculated on the training image among the first specific object proposal and the second specific object proposal, to thereby output the selected one as a specific merged object proposal corresponding to the specific identical object, wherein the IOU is an intersection over union.

As one example, at the step of (c), supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the learning device instructs the target object merging network to determine whether an IOU between the first specific object bounding box and the second specific object bounding box is equal to or greater than a first threshold, then (I) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (II) if the adjusted IOU is determined as equal to or greater than a second threshold, selects (i) one of a higher probability among the first specific object bounding box and the second specific object bounding box, or (ii) one of a larger area calculated on the training image among the first specific object bounding box and the second specific object bounding box, to thereby output the selected one as a specific merged object detection information corresponding to the specific identical object, wherein the IOU is an intersection over union.

In accordance with another aspect of the present disclosure, there is provided a method for testing an object detector based on a CNN using an image concatenation and a target object merging network, including steps of: (a) on condition that a learning device (i) has instructed a target region estimating network to search for a first target region for training to an n-th target region for training on at least one training image or its one or more resized images, wherein one or more corresponding target objects for training are estimated as located on each of the first target region for training to the n-th target region for training, (ii) has instructed an image-manipulating network to generate a first manipulated image for training to an n-th manipulated image for training, each of which corresponds to each of the first target region for training to the n-th target region for training, from the training image or its resized images, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to the target objects for training, in each of the first manipulated image for training to the n-th manipulated image for training, by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the target objects for training, and (3) (i) has instructed the target object merging network to generate merged object proposals for training by merging the first object proposals for training to the n-th object proposals for training, and generate merged object detection information for training by merging the first object detection information for training to the n-th object detection information for training, and (ii) has instructed an FC loss layer to generate one or more FC losses by referring to the merged object detection information for training and its corresponding GT, to thereby learn at least part of parameters of the FC layer and the convolutional layers by backpropagating the FC losses; a testing device, if at least one test image is acquired, (i) instructing the target region estimating network to search for a first target region for testing to an n-th target region for testing on the test image or its one or more resized images, wherein one or more corresponding target objects for testing are estimated as located on each of the first target region for testing to the n-th target region for testing, (ii) instructing the image-manipulating network to generate a first manipulated image for testing to an n-th manipulated image for testing, each of which corresponds to each of the first target region for testing to the n-th target region for testing, from the test image or its resized images and (iii) generating an integrated test image by concatenating the first manipulated image for testing to the n-th manipulated image for testing; (b) the testing device (i) instructing the convolutional layers to generate at least one integrated feature map for testing by applying the convolution operations to the integrated test image, (ii) instructing the RPN to generate each of first object proposals for testing to n-th object proposals for testing, corresponding to the target objects for testing, in each of the first manipulated image for testing to the n-th manipulated image for testing, by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the target objects for testing; and (c) the testing device (i) instructing the target object merging network to generate merged object proposals for testing by merging the first object proposals for testing to the n-th object proposals for testing, and generate merged object detection information for testing by merging the first object detection information for testing to the n-th object detection information for testing.

As one example, at the process of (3), the learning device instructs an RPN loss layer to calculate one or more RPN losses by referring to the merged object proposals and their corresponding GTs, to thereby learn parameters of the RPN by backpropagating the RPN losses.

As one example, at the step of (a), the testing device instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

As one example, the testing device instructs the image-manipulating network to add at least one zero padding region in-between each pair comprised of two neighboring adjusted manipulated images for testing which are concatenated, among the first adjusted manipulated image for testing to the n-th adjusted manipulated image for testing.

As one example, the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as S×(K−1)/2.

As one example, at the step of (c), supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing, the testing device instructs the target object merging network to determine whether an IOU for testing between the first specific object proposal for testing and the second specific object proposal for testing is equal to or greater than a first threshold, then (I) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (II) if the adjusted IOU for testing is determined as equal to or greater than a second threshold, selects (i) one of a higher probability among the first specific object proposal for testing and the second specific object proposal for testing, or (ii) one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

As one example, at the step of (c), supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing, the testing device instructs the target object merging network to determine whether an IOU for testing between the first specific object bounding box for testing and the second specific object bounding box for testing is equal to or greater than a first threshold, then (I) if the IOU for testing is determined as less than the first threshold, calculates an adjusted IOU for testing between an area, corresponding to the first specific object bounding box, on the second specific manipulated image for testing and an area, corresponding to the second specific object bounding box for testing, on the first specific manipulated image for testing, and (II) if the adjusted IOU for testing is determined as equal to or greater than a second threshold, selects (i) one of a higher probability among the first specific object bounding box for testing and the second specific object bounding box for testing, or (ii) one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

In accordance with still another aspect of the present disclosure, there is provided a learning device for learning parameters of an object detector based on a CNN using an image concatenation and a target object merging network, including: at least one memory that stores instructions; and at least one processor configured to execute the instructions to: perform processes of (I) (i) instructing a target region estimating network to search for a first target region to an n-th target region on at least one training image or its one or more resized images, wherein one or more corresponding target objects are estimated as located on each of the first target region to the n-th target region, (ii) instructing an image-manipulating network to generate a first manipulated image to an n-th manipulated image, each of which corresponds to each of the first target region to the n-th target region, from the training image or its resized images, and (iii) generating an integrated training image by concatenating the first manipulated image to the n-th manipulated image, (II) (i) instructing one or more convolutional layers to generate at least one integrated feature map by applying one or more convolution operations to the integrated training image, (ii) instructing an RPN to generate each of first object proposals to n-th object proposals, corresponding to the target objects, in each of the first manipulated image to the n-th manipulated image, by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the target objects, and (III) (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

As one example, at the process of (III), the processor instructs an RPN loss layer to calculate one or more RPN losses by referring to the merged object proposals and their corresponding GTs, to thereby learn parameters of the RPN by backpropagating the RPN losses.

As one example, at the process of (I), the processor instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

As one example, the processor instructs the image-manipulating network to add at least one zero padding region in-between each pair comprised of two neighboring adjusted manipulated images which are concatenated, among the first adjusted manipulated image to the n-th adjusted manipulated image.

As one example, the integrated training image is reduced by a ratio of $1/S$ by multiple convolution operations of the convolutional layers, and wherein, if a maximum size of each kernel of each of the convolutional layers is $K \times K$, a distance in-between said each pair comprised of the two neighboring adjusted manipulated images is determined as $S \times (K-1)/2$.

As one example, at the process of (III), supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the processor instructs the target object merging network to determine whether an IOU between the first specific object proposal and the second specific object proposal is equal to or greater than a first threshold, then (i) if the IOU is determined as less than the first threshold, calculates an adjusted IOU between an area, corresponding to the first specific object proposal, on the second specific manipulated image and an area, corresponding to the second specific object proposal, on the first specific manipulated image, and (ii) if the adjusted IOU is determined as equal to or greater than a second threshold, selects one of a higher probability among the first specific object proposal and the second specific object proposal, or one of a larger area calculated on the training image among the first specific object proposal and the second specific object proposal, to thereby output the selected one as a specific merged object proposal corresponding to the specific identical object, wherein the IOU is an intersection over union.

As one example, at the process of (II), supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the processor instructs the target object merging network to determine whether an IOU between the first specific object bounding box and the second specific object bounding box is equal to or greater than a first threshold, then (i) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (ii) if the adjusted IOU is determined as equal to or greater than a second threshold, selects one of a higher probability among the first specific object bounding box and the second specific object bounding box, or one of a larger area calculated on the training image among the first specific object bounding box and the second specific object bounding box, to thereby output the selected one as a specific merged object detection information corresponding to the specific identical object, wherein the IOU is an intersection over union.

In accordance with still yet another aspect of the present disclosure, there is provided a testing device for testing an object detector based on a CNN using an image concatenation and a target object merging network, including: at least one memory that stores instructions; and at least one processor, on condition that a learning device (i) has instructed a target region estimating network to search for a first target region for training to an n-th target region for training on at least one training image or its one or more resized images, wherein one or more corresponding target objects for training are estimated as located on each of the first target region for training to the n-th target region for training, (ii) has instructed an image-manipulating network to generate a first manipulated image for training to an n-th manipulated image for training, each of which corresponds to each of the first target region for training to the n-th target region for training, from the training image or its resized images, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to the target objects for training, in each of the first manipulated image for training to the n-th manipulated image for training, by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the target objects for training, and (3) (i) has instructed the target object merging network to generate merged object proposals for training by merging the first object proposals for training to the n-th object proposals for training, and generate merged object detection information for training by merging the first object detection information for training to the n-th object detection information for training, and (ii) has instructed an FC loss layer to generate one or more FC losses by referring to the merged object detection information for training and its corresponding GT, to thereby learn at least part of parameters of the FC layer and the convolutional layers by backpropagating the FC losses; configured to execute the instructions to: perform processes of (I) (i) instructing the target region estimating network to search for a first target region for testing to an n-th target region for testing on at least one test image or its one or more resized images, wherein one or more corresponding target objects for testing are estimated as located on each of the first target region for testing to the n-th target region for testing, (ii) instructing the image-manipulating network to generate a first manipulated image for testing to an n-th manipulated image for testing, each of which corresponds to each of the first target region for testing to the n-th target region for testing, from the test image or its resized images and (iii) generating an integrated test image by concatenating the first manipulated image for testing to the n-th manipulated image for testing, (II) (i) instructing the convolutional layers to generate at least one integrated feature map for testing by applying the convolution operations to the integrated test image, (ii) instructing the RPN to generate each of first object proposals for testing to n-th object proposals for testing, corresponding to the target objects for testing, in each of the first manipulated image for testing to the n-th manipulated image for testing, by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the target objects for testing, and (III) (i) instructing the target object merging network to generate merged object proposals for testing by merging the first object proposals for testing to the n-th object proposals for testing, and generate merged object detection information for testing by merging the first object detection information for testing to the n-th object detection information for testing.

As one example, at the process of (3), the learning device instructs an RPN loss layer to calculate one or more RPN losses by referring to the merged object proposals and their corresponding GTs, to thereby learn parameters of the RPN by backpropagating the RPN losses.

As one example, at the process of (I), the processor instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

As one example, the processor instructs the image-manipulating network to add at least one zero padding region in-between each pair comprised of two neighboring adjusted manipulated images for testing which are concatenated, among the first adjusted manipulated image for testing to the n-th adjusted manipulated image for testing.

As one example, the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as S×(K−1)/2.

As one example, at the process of (III), supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing, the processor instructs the target object merging network to determine whether an IOU for testing between the first specific object proposal for testing and the second specific object proposal for testing is equal to or greater than a first threshold, then (i) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (ii) if the adjusted IOU for testing is determined as equal to or greater than a second threshold, selects one of a higher probability among the first specific object proposal for testing and the second specific object proposal for testing, or one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

As one example, at the process of (III), supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing, the processor instructs the target object merging network to determine whether an IOU for testing between the first specific object bounding box for testing and the second specific object bounding box for testing is equal to or greater than a first threshold, then (i) if the IOU for testing is determined as less than the first threshold, calculates an adjusted IOU for testing between an area, corresponding to the first specific object bounding box, on the second specific manipulated image for testing and an area, corresponding to the second specific object bounding box for testing, on the first specific manipulated image for testing, and (ii) if the adjusted IOU for testing is determined as equal to or greater than a second threshold, selects one of a higher probability among the first specific object bounding box for testing and the second specific object bounding box for testing, or one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

In addition, recordable media that are readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

Figure 1:
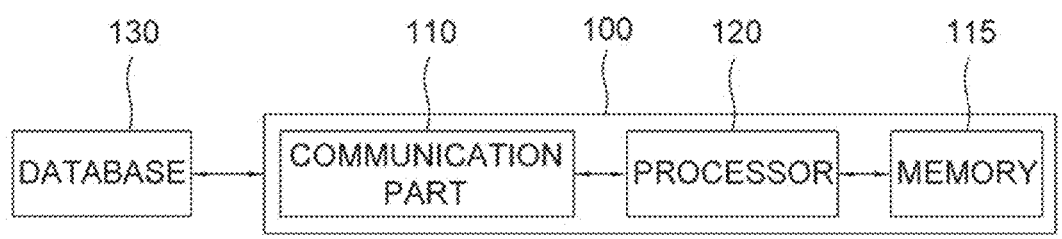

FIG. 1 is a drawing schematically illustrating a learning device for learning an object detector based on a CNN using an image concatenation and a target object merging network in accordance with one example embodiment of the present disclosure.

Figure 2:
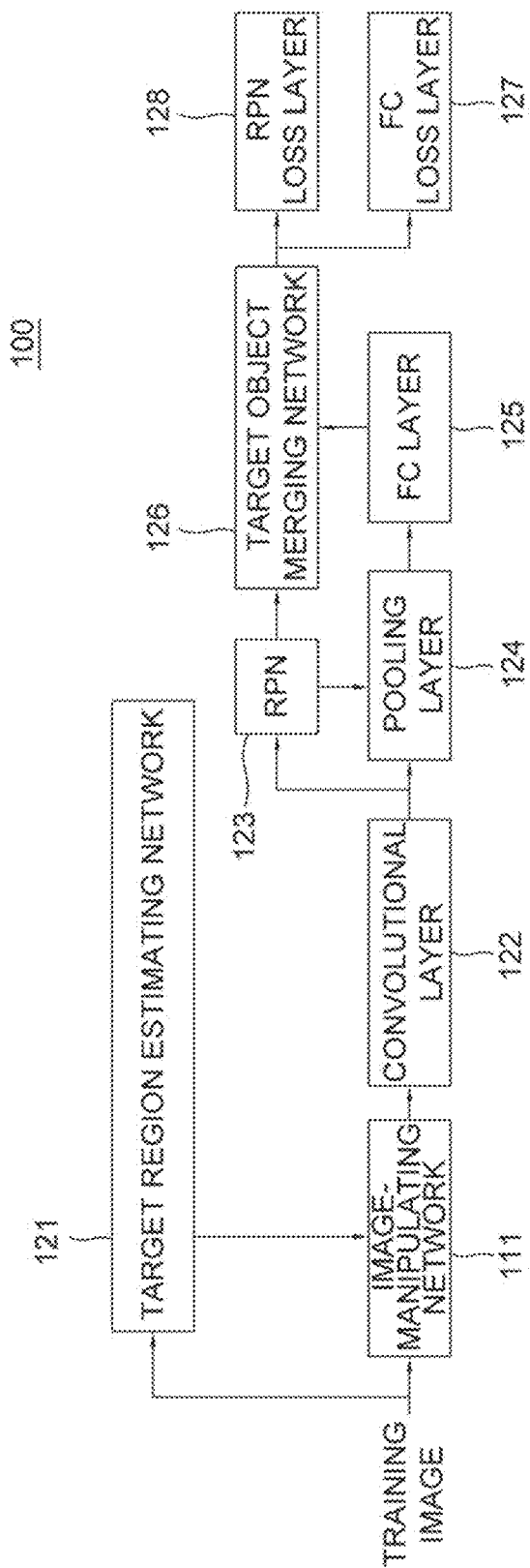

FIG. 2 is a drawing schematically illustrating a learning method for learning the object detector based on the CNN using the image concatenation and the target object merging network in accordance with one example embodiment of the present disclosure.

Figure 3:
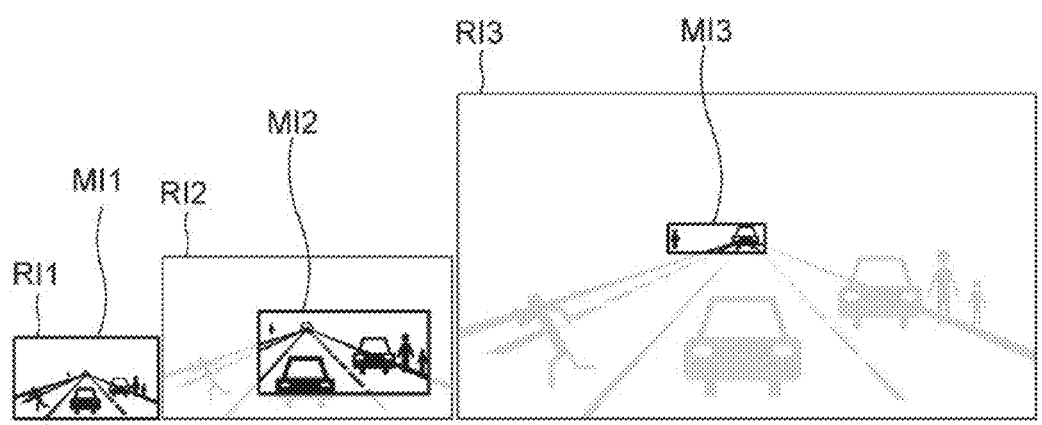

FIG. 3 is a drawing schematically illustrating a process of estimating each of target regions on images included in an image pyramid, to be used for learning the object detector based on the CNN using the image concatenation and the target object merging network in accordance with one example embodiment of the present disclosure.

Figure 4:
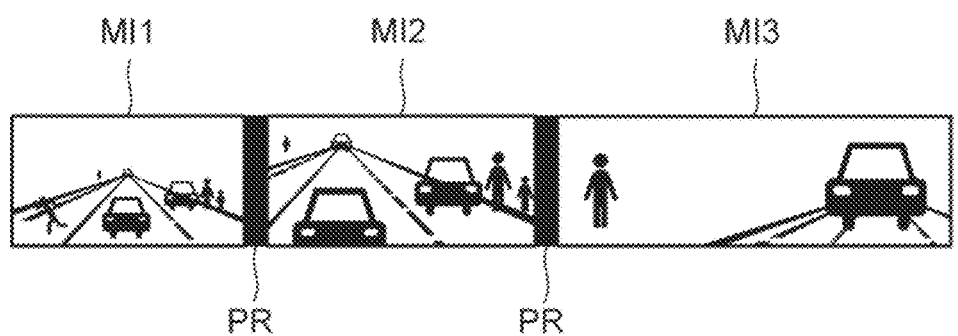

FIG. 4 is a drawing schematically illustrating a concatenation of manipulated images corresponding to each of the target regions to be used for learning the object detector based on the CNN using the image concatenation and the target object merging network in accordance with one example embodiment of the present disclosure.

Figure 5:
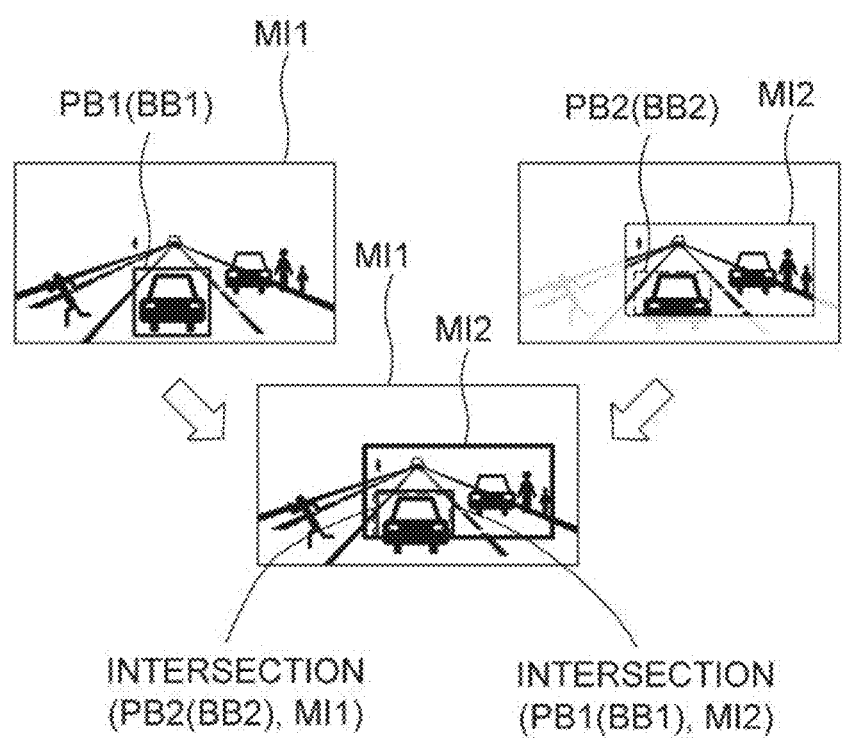

FIG. 5 is a drawing schematically illustrating a process of merging one or more target objects to be used for learning the object detector based on the CNN using the image concatenation and the target object merging network in accordance with one example embodiment of the present disclosure.

Figure 6:
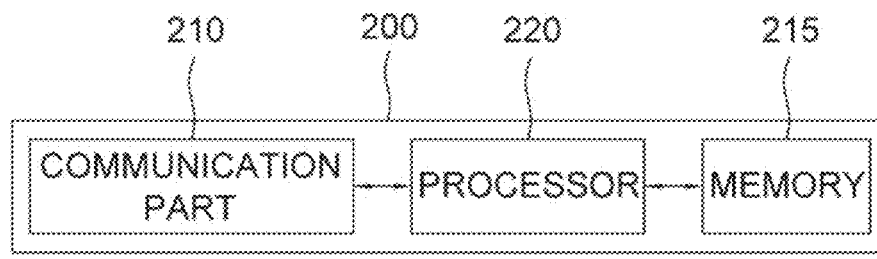

FIG. 6 is a drawing schematically illustrating a testing device for testing the object detector based on the CNN using the image concatenation and the target object merging network in accordance with one example embodiment of the present disclosure.

Figure 7:
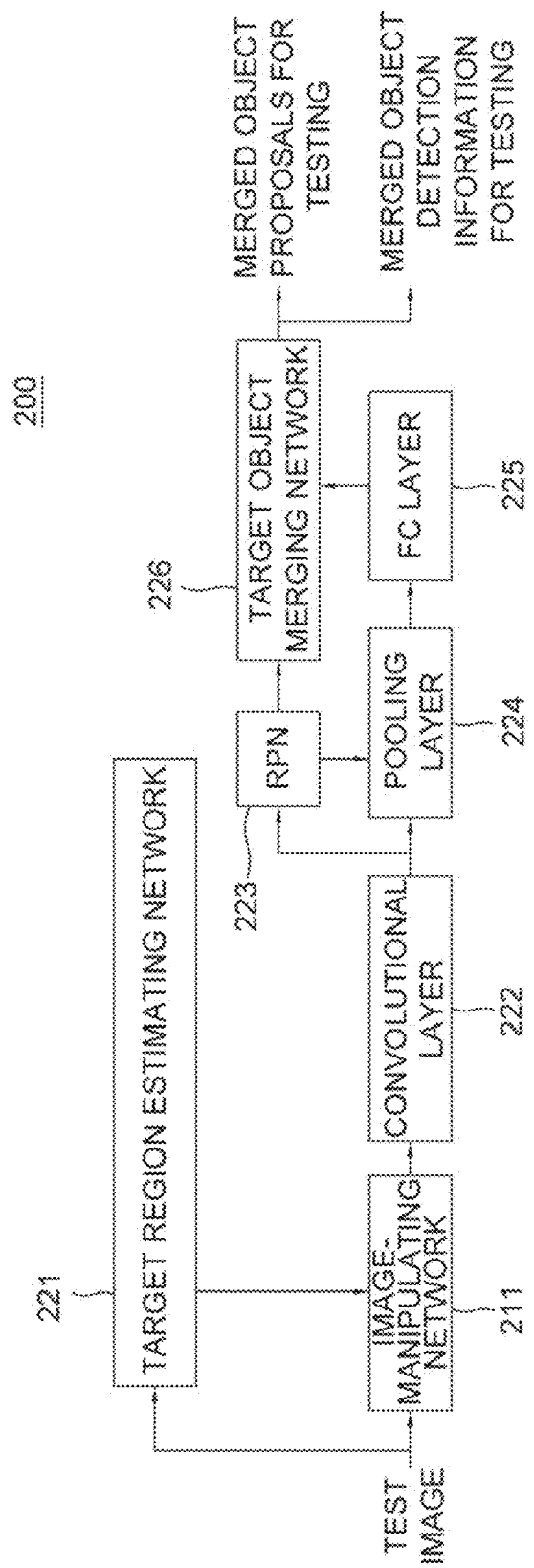

FIG. 7 is a drawing schematically illustrating a testing method for testing the object detector based on the CNN using the image concatenation and the target object merging network in accordance with one example embodiment of the present disclosure.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device for learning an object detector based on a CNN using an image concatenation and a target object merging network in accordance with one example embodiment of the present disclosure. By referring to FIG. 1, the learning device 100 may include a communication part 110 and a processor 120.

First, the communication part 110 may acquire or support another device to acquire at least one training image.

Herein, the training image may be stored in a database 130, and the database 130 may store at least one ground truth, i.e., GT, of class information on each of one or more objects in the training image and location information on each of the objects. Also, the database 130 may store at least one ground truth of class information on each of the objects and location information on each of the objects located in resized images which are generated by resizing the training image.

In addition, the learning device may further include a memory 115 capable of storing computer readable instructions for performing following processes. As one example, the processor, the memory, a medium, etc. may be integrated with an integrated processor.

Next, the processor 120 may (i) instruct a target region estimating network to search for a first target region to an n-th target region on the training image or its one or more resized images, where at least one corresponding target object is estimated as located on each of the first target region to the n-th target region, (ii) instruct an image-manipulating network to generate a first manipulated image to an n-th manipulated image, each of which corresponds to each of the first target region to the n-th target region, from the training image or its resized images, and (iii) generate an integrated training image by concatenating the first manipulated image to the n-th manipulated image. Then, the processor 120 may (i) instruct one or more convolutional layers to generate at least one integrated feature map by applying one or more convolution operations to the integrated training image, (ii) instruct an RPN to generate each of first object proposals to n-th object proposals, corresponding to the objects, in each of the first manipulated image to the n-th manipulated image by using the integrated feature map, (iii) instruct a pooling layer to apply one or more pooling operations to each region, corresponding to each of the first object proposals to the n-th object proposals, on the integrated feature map, to thereby generate at least one pooled integrated feature map, and (iv) instruct an FC layer to apply at least one fully connected operation to the pooled integrated feature map, to thereby generate first object detection information to n-th object detection information corresponding to the objects. Then the processor 120 may perform processes of (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

Also, the processor 120 may instruct at least one RPN loss layer to generate one or more RPN losses by referring to the merged object proposals and their corresponding GTs, to thereby adjust at least part of parameters of the RPN by backpropagating the RPN losses.

Herein, the learning device 100 in accordance with one example of the present disclosure may be a computing device and may be any digital device with a processor capable of computation. For reference, although FIG. 1 shows the single learning device 100, the scope of the present disclosure is not limited thereto. For example, the learning device may be configured as several devices to perform its functions.

A method for learning parameters of the object detector based on the CNN using the image concatenation and the target object merging network by using the learning device 100 in accordance with one example embodiment of the present disclosure is described by referring to FIG. 2 as follows.

First, if the training image is acquired, the learning device 100 may instruct a target region estimating network 121 to search for the first target region to the n-th target region, corresponding to at least one area, where at least one target object is estimated as located, on the training image or its resized images.

Herein, the first target region to the n-th target region may correspond to multiple different target objects among the target objects in a same image, or correspond to an identical target object among the target objects in multiple images with different sizes. Also, the first target region to the n-th target region may correspond to target objects estimated as located in each of images included in the image pyramid having different sizes of a same image.

That is, the target region estimating network 121 may search for the first target region to the n-th target region, corresponding to areas, where a first target object to an n-th target object are estimated as located, on the training image, or may search for each of the first target region to the n-th target region, corresponding to areas, where at least one specific target object is estimated as located, on each of a first resized image to an n-th resized image which are derived from the training image. Also, the target region estimating network 121 may search for a specific target region, corresponding to a specific area, where a single target object is estimated as located, on the training image, and may search for each of the first target region to the n-th target region, corresponding to the specific area, where the single target object is estimated as located, on each of the first resized image to the n-th resized image which are derived from the training image. Additionally, if there are multiple target objects on the training image, the target regions corresponding to the target objects may be estimated for each of the resized images.

In the meantime, the target region estimating network 121 may calculate each scale histogram for each of the training image or its resized images and search for the first target region to the n-th target region corresponding to scale proposals where the corresponding target objects are estimated as located, by referring to the scale histogram. Also, the target region estimating network 121 may perform segmentation on each of the training image or its resized images, may set seeds to search for the target regions based on the segmentation and may set the target regions by referring to integrated regions into which small target regions are repeatedly integrated. Additionally, the target region estimating network 121 may identify foregrounds on an image by a foreground segmentation and may set at least one area, where at least one target object is estimated as located and whose size is estimated as including the at least one target object, as at least one target region by referring to the identified foregrounds. Further, the target region estimating network 121 may use a saliency detection method for setting one or more target regions. However, the scope of the present disclosure is not limited thereto, and any method of searching for the target regions, where the target object is estimated as located, on the image may be utilized.

Next, the learning device 100 may instruct an image-manipulating network 111 to generate a first manipulated image to an n-th manipulated image, corresponding to the first target region to the n-th target region, on the training image or each of its resized images each of which corresponds to each of the first target region to the n-th target region set by the target region estimating network 121.

Herein, the learning device 100 may instruct the image-manipulating network 111 to generate the first manipulated image to the n-th manipulated image by cropping one or more regions corresponding to the first target region to the n-th target region on the training image or its resized images, or may instruct the image-manipulating network 111 to generate the first manipulated image to the n-th manipulated image by cropping and resizing one or more regions corresponding to the first target region to the n-th target region on the training image or its resized images.

As one example, by referring to FIG. 3, the first resized image RI1 including the first target region may be considered as the first manipulated image MI1. The second manipulated image MI2, corresponding to the second target region, may be generated from the second resized image RI2, and the third manipulated image MI3, corresponding to the third target region, may be generated from the third resized image RI3.

Then, the learning device 100 may instruct the image-manipulating network 111 to generate the integrated training image by concatenating the first manipulated image to the third manipulated image.

Herein, the learning device 100 may instruct the image-manipulating network 111 to adjust at least one of widths and lengths of the first manipulated image to the third manipulated image to be identical, and concatenate the first adjusted manipulated image to the third adjusted manipulated image in a direction of the widths or the lengths which are adjusted to be identical.

Then, the learning device 100 may instruct the image-manipulating network 111 to add at least one zero padding region in-between each pair comprised of two neighboring adjusted manipulated images which are concatenated, among the first adjusted manipulated image to the third adjusted manipulated image. Herein, the integrated training image may be reduced by a ratio of 1/S by multiple convolution operations of the convolutional layers, and if a maximum size of each kernel of each of the convolutional layers is K×K, a distance in-between said each pair comprised of the two neighboring adjusted manipulated images may be determined as S×(K−1)/2. As a result, an overhead to the CNN may be minimized.

As one example, by referring to FIG. 4, a height of the first manipulated image MI1, that of the second manipulated image MI2, and that of the third manipulated image MI3 generated by processes shown in FIG. 3 may be adjusted to be identical with each other and these manipulated images may be concatenated. Herein, each zero padding region PR may be added between each of the neighboring adjusted manipulated images. As another example, widths of the manipulated images may be adjusted to be identical and then each of the manipulated images may be concatenated by using the adjusted widths, or the widths and the heights are adjusted to be identical and then each of the manipulated images may be concatenated into a large squared shape.

Next, the learning device 100 may instruct a convolutional layer 122 to apply the convolution operations to the integrated training image, to thereby generate at least one integrated feature map. Herein, the convolutional layer 122 may be a single convolutional layer or multiple convolutional layers.

Then, the learning device 100 may instruct an RPN 123 to generate one or more first object proposals to one or more n-th object proposals corresponding to the objects in the first manipulated image to the n-th manipulated image included in the integrated training image by using the integrated feature map.

Herein, each of the first object proposals to the n-th object proposals may correspond to each of the objects in the first manipulated image to the n-th manipulated image, and each of the object proposals may include information on each proposal box having location information corresponding to each of the objects, i.e., a tagged area and information on whether it is an object. Herein, the information on whether it is an object may include probability information by which said each object proposal is estimated as an object, and information on the proposal box may include probability information by which the proposal box is estimated as matching the location of the object.

Then, the learning device 100 may instruct a pooling layer 124 to apply the pooling operations to each region, corresponding to each of the first object proposals to the n-th object proposals, on the integrated feature map, to thereby generate at least one pooled integrated feature map, and may instruct an FC layer 125 to apply the fully connected operation to the pooled integrated feature map, to thereby generate first object detection information to n-th object detection information corresponding to the objects.

Herein, the first object detection information to the n-th object detection information may include class information on each of the objects corresponding to the first object proposals to the n-th object proposals and information on bounding boxes, i.e., location information on each of the objects. Also, the class information may include probability information by which each of the first objects is estimated as each class, and the information on the bounding boxes may include probability information by which each of the bounding boxes is estimated as matching the location of the object.

Then the learning device 100 may perform processes of (i) instructing the target object merging network 126 to generate merged object proposals by merging the first object proposals to the n-th object proposals, and generate merged object detection information by merging the first object detection information to the n-th object detection information. Herein, information on the first object proposals to the n-th object proposals may be converted to be corresponding to the training image.

As one example, by referring to FIG. 5, supposing that at least one specific identical object is located on the first manipulated image MI1 and the second manipulated image MI2, and that at least one object proposal, corresponding to the specific identical object, among the first object proposals on the first manipulated image MI1, is a first specific object proposal PB1, and that at least one object proposal, corresponding to the specific identical object, among the second object proposals on the second manipulated image MI2, is a second specific object proposal PB2, the learning device 100 may instruct the target object merging network 126 to determine whether an IOU between the first specific object proposal PB1 and the second specific object proposal PB2 is equal to or greater than a first threshold. Herein, the IOU is an intersection over union. Then, if the IOU is determined as less than the first threshold, an adjusted IOU between the first specific object proposal PB1 and the second specific object proposal PB2 may be calculated.

Herein, the adjusted IOU may be an IOU calculated by referring to intersection (PB1, MI2), i.e., an area, corresponding to the first specific object proposal PB1, on the second manipulated image MI2, and intersection(PB2, MI1), i.e., an area, corresponding to the second specific object proposal PB2, on the first manipulated image MI1.

And if the adjusted IOU is determined as equal to or greater than a second threshold, the learning device 100 may select (i) one of a higher probability among the first specific object proposal PB1 and the second specific object proposal PB2, or (ii) one of a larger area calculated on the training image among the first specific object proposal PB1 and the second specific object proposal PB2, to thereby output the selected one as a specific merged object proposal corresponding to the specific identical object.

However, if the adjusted IOU is determined as less than the second threshold, the learning device 100 may determine that the first specific object proposal PB1 and the second specific object proposal PB2 respectively correspond to different objects. That is, if the IOU between the first specific object proposal PB1 and the second specific object proposal PB2 is determined as less than the first threshold and the adjusted IOU between those two is determined as less than the second threshold, the learning device 100 may determine that the first specific object proposal PB1 and the second specific object proposal PB2 respectively correspond to different objects.

In the meantime, if the IOU between the first specific object proposal PB1 and the second specific object proposal PB2 is determined as equal to or greater than the first threshold, the learning device may select (i) one of a higher probability among the first specific object proposal PB1 and the second specific object proposal PB2, or (ii) one of a larger area calculated on each of the manipulated images MI1 and MI2 among the first specific object proposal PB1 and the second specific object proposal PB2, to thereby output the selected one as the specific merged object proposal corresponding to the specific identical object.

Also, by referring to FIG. 5, supposing that at least one specific identical object is located on the first manipulated image MI1 and the second manipulated image MI2, and that at least one object bounding box, corresponding to the specific identical object, among object bounding boxes included in the first object detection information on the first manipulated image MI1, is a first specific object bounding box BB1, and that at least one object bounding box, corresponding to the specific identical object, among object bounding boxes included in the second object detection information on the second manipulated image MI2, is a second specific object bounding box BB2, the learning device 100 may instruct the target object merging network 126 to determine whether the IOU between the first specific object bounding box BB1 and the second specific object bounding box BB2 is equal to or greater than the first threshold. Herein, the first threshold used for the IOU between the object proposals and the first threshold used for the IOU between the object bounding boxes may be the same or different. Then, if the IOU between these two bounding boxes is determined as less than the first threshold, an adjusted IOU between the first specific object bounding box BB1 and the second specific object bounding box BB2 may be calculated.

Herein, the adjusted IOU may be an IOU calculated by referring to intersection(BB1, MI2), i.e., an area, corresponding to the first specific object bounding box BB1, on the second manipulated image MI2, and intersection(BB2, MI1), i.e., an area, corresponding to the second specific object bounding box BB2, on the first manipulated image MI1.

And if the adjusted IOU is determined as equal to or greater than the second threshold, the learning device 100 may select (i) one of a higher probability among the first specific object bounding box BB1 and the second specific object bounding box BB2, or (ii) one of a larger area calculated on the training image among the first specific object bounding box BB1 and the second specific object bounding box BB2, to thereby output the selected one as a specific merged object detection information corresponding to the specific identical object. Herein, the second threshold used for the IOU between the object proposals and the second threshold used for the IOU between the object bounding boxes may be the same or may be different.

However, if the adjusted IOU is determined as less than the second threshold, the learning device 100 may determine that the first specific object bounding box BB1 and the second specific object bounding box BB2 respectively correspond to different objects. That is, if the IOU between the first specific object bounding box BB1 and the second specific object bounding box BB2 is determined as less than the first threshold and the adjusted IOU between those two is determined as less than the second threshold, the learning device 100 may determine that the first specific object bounding box BB1 and the second specific object bounding box BB2 respectively correspond to different objects.

In the meantime, if the IOU between the first specific object bounding box BB1 and the second specific object bounding box BB2 is determined as equal to or greater than the first threshold, the learning device may select (i) one of a higher probability among the first specific object bounding box BB1 and the second specific object bounding box BB2, or (ii) one of a larger area calculated on each of the manipulated images MI1 and MI2 among the first specific object bounding box BB1 and the second specific object bounding box BB2, to thereby output the selected one as the specific merged object detection information corresponding to the specific identical object.

Then, the learning device 100 may instruct at least one FC loss layer 127 to generate one or more FC losses by referring to the merged object detection information and its corresponding GT, to thereby adjust at least part of parameters of the FC layer 125 and the convolutional layer 122 by backpropagating the FC losses.

Also, the learning device 100 may instruct at least one RPN loss layer 128 to generate one or more RPN losses by referring to the merged object proposals and their corresponding GTs, to thereby adjust at least part of parameters of the RPN 123 by backpropagating the RPN losses.

By using the method above, the objects with various sizes on the training image, especially the objects in the long distance which are small-sized, are detected efficiently. Also, computational load is reduced since only regions corresponding to the estimated target regions are used and thus computation time of the object detector based on the CNN is reduced.

Also, in the description so far, it is assumed that there is just one target object on the training image, however, even in case there are multiple target objects on the training image, detection of each of the target objects is possible by using each target region corresponding to each of the target objects on the training image as in the method mentioned above.

FIG. 6 is a drawing schematically illustrating a testing device for testing the object detector based on the CNN using the image concatenation and the target object merging network in accordance with one example embodiment of the present disclosure, and by referring to FIG. 6, the testing device 200 may include a communication part 210 and a processor 220.

First, the communication part 210 may acquire or support another device to acquire at least one test image.

In addition, the testing device may further include a memory 215 capable of storing computer readable instructions for performing following processes. As one example, the processor, the memory, a medium, etc. may be integrated with an integrated processor.

Herein, the object detector based on the CNN using the image concatenation and the target object merging network may have been learned by the learning method described by referring to FIGS. 1 to 5.

For reference, in the description below, the phrase "for training" is added for terms related to the learning processes, and the phrase "for testing" is added for terms related to testing processes, to avoid possible confusion.

That is, if at least one training image has been acquired, the learning device may have performed processes of (a) (i) instructing the target region estimating network to search for a first target region for training to an n-th target region for training on the training image or its one or more resized images, wherein at least one corresponding target object for training is estimated as located on each of the first target region for training to the n-th target region for training, (ii) instructing the image-manipulating network to generate a first manipulated image for training to an n-th manipulated image for training, each of which corresponds to each of the first target region for training to the n-th target region for training, from the training image or its resized images and (iii) generating an integrated training image by concatenating the first manipulated image for training to the n-th manipulated image for training; (b) (i) instructing the convolutional layers to generate at least one integrated feature map for training by applying the convolution operations to the integrated training image, (ii) instructing the RPN to generate each of first object proposals for training to n-th object proposals for training, corresponding to the target object for training, in each of the first manipulated image for training to the n-th manipulated image for training by using the integrated feature map for training, (iii) instructing the pooling layer to apply the pooling operations to each region, corresponding to each of the first object proposals for training to the n-th object proposals for training, on the integrated feature map for training, to thereby generate at least one pooled integrated feature map for training, and (iv) instructing the FC layer to apply the fully connected operation to the pooled integrated feature map for training, to thereby generate first object detection information for training to n-th object detection information for training corresponding to the target object for training; and (c) (i) instructing the target object merging network to generate merged object proposals for training by merging the first object proposals for training to the n-th object proposals for training, and generate merged object detection information for training by merging the first object detection information for training to the n-th object detection information for training, and (ii) instructing the FC loss layer to generate the FC losses by referring to the merged object detection information for training and its corresponding GT, to thereby learn at least part of parameters of the FC layer and the convolutional layers by backpropagating the FC losses.

Also, the learning device may have instructed at least one RPN loss layer to generate one or more RPN losses by referring to the merged object proposals for training and their corresponding GTs, to thereby adjust at least part of parameters of the RPN by backpropagating the RPN losses.

Next, the processor 220 may (i) instruct the target region estimating network to search for a first target region for testing to an n-th target region for testing on at least one test image or its one or more resized images, where one or more corresponding target objects for testing are estimated as located on each of the first target region for testing to the n-th target region for testing, (ii) instruct the image-manipulating network to generate a first manipulated image for testing to an n-th manipulated image for testing, from the test image or its resized images, each of which corresponds to each of the first target region for testing to the n-th target region for testing, and (iii) generate an integrated test image by concatenating the first manipulated image for testing to the n-th manipulated image for testing. Then, the processor 220 may (i) instruct the convolutional layers to generate at least one integrated feature map for testing by applying the convolution operations to the integrated test image, (ii) instruct the RPN to generate each of first object proposals for testing to n-th object proposals for testing, corresponding to one or more objects for testing, in each of the first manipulated image for testing to the n-th manipulated image for testing by using the integrated feature map for testing, (iii) instruct the pooling layer to apply the pooling operations to each region, corresponding to each of the first object proposals for testing to the n-th object proposals for testing, on the integrated feature map for testing, to thereby generate at least one pooled integrated feature map for testing, and (iv) instruct the FC layer to apply the fully connected operation to the pooled integrated feature map for testing, to thereby generate first object detection information for testing to n-th object detection information for testing corresponding to the objects for testing. Then the processor 220 may perform processes of (i) instructing the target object merging network to generate merged object proposals for testing by merging the first object proposals for testing to the n-th object proposals for testing, and generate merged object detection information for testing by merging the first object detection information for testing to the n-th object detection information for testing.

Herein, the testing device 200 in accordance with one example embodiment of the present disclosure may be a computing device and may be any device with a processor capable of computation. For reference, although FIG. 6 shows the single testing device 200, the scope of the present disclosure is not limited thereto. For example, the testing device may be configured as several devices to perform its functions.

A method for learning parameters of the object detector based on the CNN using the image concatenation and the target object merging network by using the testing device 200 in accordance with one example embodiment of the present disclosure is described by referring to FIG. 7 as follows. In the description below, the part easily deducible from the learning method described by referring to FIGS. 1 to 5 will be omitted.

First, on condition that at least part of parameters of an FC layer 225, a convolutional layer 222, and an RPN 223 has been learned according to the learning method described by referring to FIGS. 1 to 5, if the test image is inputted, the testing device 200 may instruct a target region estimating network 221 to search for the first target region for testing to the n-th target region for testing, corresponding to at least one area, where the target objects for testing are estimated as located, on the test image or its resized images.

Herein, the first target region for testing to the n-th target region for testing may correspond to multiple different target objects for testing among the target objects for testing in a same test image, or correspond to an identical target object for testing among the target objects for testing in multiple images with different sizes. Also, the first target region for testing to the n-th target region for testing may correspond to the target objects for testing estimated as located in each of images included in the image pyramid having different sizes of a same image.

That is, the target region estimating network 221 may search for the first target region for testing to the n-th target region for testing, corresponding to areas, where the first target object for testing to the n-th target object for testing are estimated as located, on the test image, or may search for each of the first target region for testing to the n-th target region for testing, corresponding to areas, where at least one specific target object for testing is estimated as located, on each of a first resized image for testing to an n-th resized image for testing which are derived by resizing the test image. Also, the target region estimating network 221 may search for a specific target region for testing, corresponding to a specific area, where a single target object for testing is estimated as located, on the test image, and may search for each of the first target region for testing to the n-th target region for testing, corresponding to the specific area, where the single target object for testing is estimated as located, on each of a first resized image for testing to an n-th resized image for testing which are derived by resizing the test image. Additionally, if there are multiple target objects for testing on the test image, the target regions for testing corresponding to the target objects for testing may be estimated for each of the resized images.

Next, the testing device 200 may instruct the image-manipulating network 211 to generate a first manipulated image for testing to an n-th manipulated image for testing, corresponding to the first target region for testing to the n-th target region for testing, on the test image or its resized images each of which corresponds to each of the first target region for testing to the n-th target region for testing set by the target region estimating network 221.

Herein, the testing device 200 may instruct the image-manipulating network 211 to generate the first manipulated image for testing to the n-th manipulated image for testing by cropping one or more regions corresponding to the first target region for testing to the n-th target region for testing on the test image or its resized images, or may instruct the image-manipulating network 211 to generate the first manipulated image for testing to the n-th manipulated image for testing by cropping and resizing one or more regions corresponding to the first target region for testing to the n-th target region for testing on the test image or its resized images.

Then, the testing device 200 may instruct the image-manipulating network 211 to generate the integrated test image by concatenating the first manipulated image for testing to the n-th manipulated image for testing.

Herein, the testing device 200 may instruct the image-manipulating network 211 to adjust at least one of widths and lengths of the first manipulated image for testing to the n-th manipulated image for testing to be identical, and concatenate the first adjusted manipulated image for testing to the n-th adjusted manipulated image for testing in a direction of the widths or the lengths which are adjusted to be identical.

Then, the testing device 200 may instruct the image-manipulating network 211 to add at least one zero padding region in-between each pair comprised of two neighboring adjusted manipulated images for testing which are concatenated, among the first adjusted manipulated image for testing to the n-th adjusted manipulated image for testing. Herein, the integrated test image may be reduced by a ratio of 1/S by the multiple convolution operations of the convolutional layers, and if a maximum size of each kernel of each of the convolutional layers is K×K, a distance in-between said each pair comprised of the two neighboring adjusted manipulated images for testing may be determined as S×(K−1)/2.

Next, the testing device 200 may instruct the convolutional layer 222 to apply the convolution operations to the integrated test image, to thereby generate at least one integrated feature map for testing. Herein, the convolutional layer 222 may be a single convolutional layer or multiple convolutional layers.

Then, the testing device 200 may instruct an RPN 223 to generate one or more first object proposals for testing to one or more n-th object proposals for testing corresponding to the objects for testing in the first manipulated image for testing to the n-th manipulated image for testing included in the integrated test image by using the integrated feature map for testing.

Herein, each of the first object proposals for testing to the n-th object proposals for testing may include information on each proposal box for testing having location information corresponding to each of the objects for testing, i.e., a tagged area and information on whether it is an object.

Then, the testing device 200 may instruct a pooling layer 224 to apply the pooling operations to each region, corresponding to each of the first object proposals for testing to the n-th object proposals for testing, on the integrated feature map for testing, to thereby generate at least one pooled integrated feature map for testing, and may instruct the FC layer 225 to apply the fully connected operation to the pooled integrated feature map for testing, to thereby generate first object detection information for testing to n-th object detection information for testing corresponding to the objects for testing.

Herein, the first object detection information for testing to the n-th object detection information for testing may include information on bounding boxes, i.e., location information on each of the objects for testing, and class information on each of the objects for testing corresponding to the first object proposals for testing to the n-th object proposals for testing.

Then the testing device 200 may perform processes of (i) instructing a target object merging network 226 to generate merged object proposals for testing by merging the first object proposals for testing to the n-th object proposals for testing, and generate merged object detection information for testing by merging the first object detection information for testing to the n-th object detection information for testing. Herein, information on the first object proposals for testing to the n-th object proposals for testing may be converted to be corresponding to the test image.

As one example, as described by referring to FIG. 6, supposing that at least one specific identical object for testing is located on the first manipulated image for testing MI1 and the second manipulated image for testing MI2, and that at least one object proposal for testing, corresponding to the specific identical object for testing, among the first object proposals for testing on the first manipulated image for testing MI1, is a first specific object proposal for testing PB1, and that at least one object proposal for testing, corresponding to the specific identical object for testing, among the second object proposals for testing on the second manipulated image for testing MI2, is a second specific object proposal for testing PB2, the testing device 200 may instruct the target object merging network 226 to determine whether an IOU between the first specific object proposal for testing PB1 and the second specific object proposal for testing PB2 is equal to or greater than the first threshold. Herein, the IOU is an intersection over union. Then, if the IOU is determined as less than the first threshold, an adjusted IOU between the first specific object proposal for testing PB1 and the second specific object proposal for testing PB2 may be calculated.

Herein, the adjusted IOU may be an IOU calculated by referring to intersection(PB1, MI2), i.e., an area, corresponding to the first specific object proposal for testing PB1, on the second manipulated image for testing MI2, and intersection(PB2, MI1), i.e., an area, corresponding to the second specific object proposal for testing PB2, on the first manipulated image for testing MI1.

And if the adjusted IOU for testing is determined as equal to or greater than the second threshold, the testing device 200 may select (i) one of a higher probability among the first specific object proposal for testing PB1 and the second specific object proposal for testing PB2, or (ii) one of a larger area calculated on the test image among the first specific object proposal for testing PB1 and the second specific object proposal for testing PB2, to thereby output the selected one as a specific merged object proposal for testing corresponding to the specific identical object for testing.

However, if the adjusted IOU is determined as less than the second threshold, the testing device 200 may determine that the first specific object proposal for testing PB1 and the second specific object proposal for testing PB2 respectively correspond to different objects for testing. That is, if the IOU between the first specific object proposal for testing PB1 and the second specific object proposal for testing PB2 is determined as less than the first threshold and the adjusted IOU between those two is determined as less than the second threshold, the testing device 100 may determine that the first specific object proposal for testing PB1 and the second specific object proposal for testing PB2 respectively correspond to different objects for testing.

In the meantime, if the IOU between the first specific object proposal for testing PB1 and the second specific object proposal for testing PB2 is determined as equal to or greater than the first threshold, the testing device may select (i) one of a higher probability among the first specific object proposal for testing PB1 and the second specific object proposal for testing PB2, or (ii) one of a larger area calculated on each of the manipulated images for testing MI1 and MI2 among the first specific object proposal for testing PB1 and the second specific object proposal for testing PB2, to thereby output the selected one as the specific merged object proposal for testing corresponding to the specific identical object for testing.

Also, as described by referring to FIG. 6, supposing that at least one specific identical object for testing is located on the first manipulated image for testing MI1 and the second manipulated image for testing MI2, and that at least one object bounding box for testing, corresponding to the specific identical object for testing, among object bounding boxes for testing included in the first object detection information for testing on the first manipulated image for testing MI1, is a first specific object bounding box for testing BB1, and that at least one object bounding box for testing, corresponding to the specific identical object for testing, among object bounding boxes for testing included in the second object detection information for testing on the second manipulated image for testing MI2, is a second specific object bounding box for testing BB2, the testing device 200 may instruct the target object merging network 226 to determine whether the IOU between the first specific object bounding box for testing BB1 and the second specific object bounding box for testing BB2 is equal to or greater than the first threshold. Herein, the first threshold used for the IOU between the object proposals for testing and the first threshold used for the IOU between the object bounding boxes for testing may be the same or different. Then, if the IOU between these two bounding boxes for testing is determined as less than the first threshold, an adjusted IOU between the first specific object bounding box for testing BB1 and the second specific object bounding box for testing BB2 may be calculated.

Herein, the adjusted IOU may be an IOU calculated by referring to intersection(BB1, MI2), i.e., an area, corresponding to the first specific object bounding box for testing BB1, on the second manipulated image for testing MI2, and intersection(BB2, MI1), i.e., an area, corresponding to the second specific object bounding box for testing BB2, on the first manipulated image for testing MI1.

And if the adjusted IOU for testing is determined as equal to or greater than the second threshold, the testing device 200 may select (i) one of a higher probability among the first specific object bounding box for testing BB1 and the second specific object bounding box for testing BB2, or (ii) one of a larger area calculated on the test image among the first specific object bounding box for testing BB1 and the second specific object bounding box for testing BB2, to thereby output the selected one as a specific merged object detection information for testing corresponding to the specific identical object for testing. Herein, the second threshold used for the IOU between the object proposals for testing and the second threshold used for the IOU between the object bounding boxes for testing may be the same or may be different.

However, if the adjusted IOU is determined as less than the second threshold, the testing device 200 may determine that the first specific object bounding box for testing BB1 and the second specific object bounding box for testing BB2 respectively correspond to different objects for testing. That is, if the IOU between the first specific object bounding box for testing BB1 and the second specific object bounding box for testing BB2 is determined as less than the first threshold and the adjusted IOU between those two is determined as less than the second threshold, the testing device 200 may determine that the first specific object bounding box for testing BB1 and the second specific object bounding box for testing BB2 respectively correspond to different objects for testing.

In the meantime, if the IOU between the first specific object bounding box for testing BB1 and the second specific object bounding box for testing BB2 is determined as equal to or greater than the first threshold, the testing device may select (i) one of a higher probability among the first specific object bounding box for testing BB1 and the second specific object bounding box for testing BB2, or (ii) one of a larger area calculated on each of the manipulated images for testing MI1 and MI2 among the first specific object bounding box for testing BB1 and the second specific object bounding box for testing BB2, to thereby output the selected one as the specific merged object detection information for testing corresponding to the specific identical object for testing.

By using the method above, the objects with various sizes on the test image, especially the objects in the long distance which are small-sized, are detected efficiently. Also, computational load is reduced since only regions corresponding to the estimated target regions are used and thus computation time of the object detector based on the CNN is reduced.

Also, in the description so far, it is assumed that there is just one target object on the test image, however, in case there are multiple target objects on the test image, detection of each of the target objects is possible by using each target region corresponding to each of the target objects on the test image as in the method mentioned above.

The present disclosure has an effect of effectively detecting the objects on the image without regard to their sizes.

The present disclosure has another effect of detecting the objects on the image without additional computational load.

The present disclosure has still another effect of efficiently detecting the objects and reducing computational time of the CNN, by using target regions corresponding to objects with various sizes.

The CNN may be adaptable to customers' requirements such as KPI(key performance index), and may be redesigned when scales of objects change as a focal length or a resolution changes depending on the KPI. In this method, lidar may be used to detect the object proposals. Also, the method can be useful for multi-camera, SVM(surround view monitor), and the like, as accuracy of 2D bounding boxes improves.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of an object detector based on a CNN using an image concatenation and a target object merging network, comprising steps of:
 (a) a learning device, if at least one training image is acquired, (i) instructing a target region estimating network to search for a first target region to an n-th target region on the training image or its one or more resized images, wherein one or more corresponding target objects are estimated as located on each of the first target region to the n-th target region, (ii) instructing an image-manipulating network to generate a first manipulated image to an n-th manipulated image, each of which corresponds to each of the first target region to the n-th target region, from the training image or its resized images, and (iii) generating an integrated training image by concatenating the first manipulated image to the n-th manipulated image;
 (b) the learning device (i) instructing one or more convolutional layers to generate at least one integrated feature map by applying one or more convolution operations to the integrated training image, (ii) instructing an RPN to generate each of first object proposals to n-th object proposals, corresponding to the target objects, in each of the first manipulated image to the n-th manipulated image, by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the target objects; and (c) the learning device (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

2. The method of claim 1, wherein, at the step of (c), the learning device instructs an RPN loss layer to calculate one or more RPN losses by referring to the merged object proposals and their corresponding GTs, to thereby learn parameters of the RPN by backpropagating the RPN losses.

3. The method of claim 1, wherein, at the step of (a), the learning device instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

4. The method of claim 3, wherein, the learning device instructs the image-manipulating network to add at least one zero padding region in-between each pair comprised of two neighboring adjusted manipulated images which are concatenated, among the first adjusted manipulated image to the n-th adjusted manipulated image.

5. The method of claim 4, wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as S×(K−1)/2.

6. The method of claim 1, wherein, at the step of (c), supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the learning device instructs the target object merging network to determine whether an IOU between the first specific object proposal and the second specific object proposal is equal to or greater than a first threshold, then (I) if the IOU is determined as less than the first threshold, calculates an adjusted IOU between an area, corresponding to the first specific object proposal, on the second specific manipulated image and an area, corresponding to the second specific object proposal, on the first specific manipulated image, and (II) if the adjusted IOU is determined as equal to or greater than a second threshold, selects (i) one of a higher probability among the first specific object proposal and the second specific object proposal, or (ii) one of a larger area calculated on the training image among the first specific object proposal and the second specific object proposal, to thereby output the selected one as a specific merged object proposal corresponding to the specific identical object, wherein the IOU is an intersection over union.

7. The method of claim 1, wherein, at the step of (c), supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the learning device instructs the target object merging network to determine whether an IOU between the first specific object bounding box and the second specific object bounding box is equal to or greater than a first threshold, then (I) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (II) if the adjusted IOU is determined as equal to or greater than a second threshold, selects (i) one of a higher probability among the first specific object bounding box and the second specific object bounding box, or (ii) one of a larger area calculated on the training image among the first specific object bounding box and the second specific object bounding box, to thereby output the selected one as a specific merged object detection information corresponding to the specific identical object, wherein the IOU is an intersection over union.

8. A method for testing an object detector based on a CNN using an image concatenation and a target object merging network, comprising steps of:

(a) on condition that a learning device (i) has instructed a target region estimating network to search for a first target region for training to an n-th target region for training on at least one training image or its one or more resized images, wherein one or more corresponding target objects for training are estimated as located on each of the first target region for training to the n-th target region for training, (ii) has instructed an image-manipulating network to generate a first manipulated image for training to an n-th manipulated image for training, each of which corresponds to each of the first target region for training to the n-th target region for training, from the training image or its resized images, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to the target objects for training, in each of the first manipulated image for training to the n-th manipulated image for training, by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the target objects for training, and (3) (i) has instructed the target object merging network to generate merged object proposals for training by merging the first object proposals for training to the n-th object proposals for training, and generate merged object detection information for training by merging the first object detection information for training to the n-th object detection information for training, and (ii) has instructed an FC loss layer to generate one or more FC losses by referring to the merged object detection information for training and its corresponding GT, to thereby learn at least part of parameters of the FC layer and the convolutional layers by backpropagating the FC losses; a testing device, if at least one test image is acquired, (i) instructing the target region estimating network to search for a first target region for testing to an n-th target region for testing on the test image or its one or more resized images, wherein one or more corresponding target objects for testing are estimated as located on each of the first target region for testing to the n-th target region for testing, (ii) instructing the image-manipulating network to generate a first manipulated image for testing to an n-th manipulated image for testing, each of which corresponds to each of the first target region for testing to the n-th target region for testing, from the test image or its resized images and (iii) generating an integrated test image by concatenating the first manipulated image for testing to the n-th manipulated image for testing;
(b) the testing device (i) instructing the convolutional layers to generate at least one integrated feature map for testing by applying the convolution operations to the integrated test image, (ii) instructing the RPN to generate each of first object proposals for testing to n-th object proposals for testing, corresponding to the target objects for testing, in each of the first manipulated image for testing to the n-th manipulated image for testing, by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the target objects for testing; and
(c) the testing device (i) instructing the target object merging network to generate merged object proposals for testing by merging the first object proposals for testing to the n-th object proposals for testing, and generate merged object detection information for testing by merging the first object detection information for testing to the n-th object detection information for testing.

9. The method of claim 8, wherein, at the process of (3), the learning device instructs an RPN loss layer to calculate one or more RPN losses by referring to the merged object proposals and their corresponding GTs, to thereby learn parameters of the RPN by backpropagating the RPN losses.

10. The method of claim 8, wherein, at the step of (a), the testing device instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

11. The method of claim 10, wherein, the testing device instructs the image-manipulating network to add at least one zero padding region in-between each pair comprised of two neighboring adjusted manipulated images for testing which are concatenated, among the first adjusted manipulated image for testing to the n-th adjusted manipulated image for testing.

12. The method of claim 11, wherein the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as S×(K−1)/2.

13. The method of claim 8, wherein, at the step of (c), supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing,
the testing device instructs the target object merging network to determine whether an IOU for testing between the first specific object proposal for testing and the second specific object proposal for testing is equal to or greater than a first threshold, then (I) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (II) if the adjusted IOU for testing is determined as equal to or greater than a second threshold, selects (i) one of a higher probability among the first specific object proposal for testing and the second specific object proposal for testing, or (ii) one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

14. The method of claim 8, wherein, at the step of (c), supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing, the testing device instructs the target object merging network to determine whether an IOU for testing between the first specific object bounding box for testing and the second specific object bounding box for testing is equal to or greater than a first threshold, then (I) if the IOU for testing is determined as less than the first threshold, calculates an adjusted IOU for testing between an area, corresponding to the first specific object bounding box, on the second specific manipulated image for testing and an area, corresponding to the second specific object bounding box for testing, on the first specific manipulated image for testing, and (II) if the adjusted IOU for testing is determined as equal to or greater than a second threshold, selects (i) one of a higher probability among the first specific object bounding box for testing and the second specific object bounding box for testing, or (ii) one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

15. A learning device for learning parameters of an object detector based on a CNN using an image concatenation and a target object merging network, comprising:

at least one memory that stores instructions; and at least one processor configured to execute the instructions to: perform processes of (I) (i) instructing a target region estimating network to search for a first target region to an n-th target region on at least one training image or its one or more resized images, wherein one or more corresponding target objects are estimated as located on each of the first target region to the n-th target region, (ii) instructing an image-manipulating network to generate a first manipulated image to an n-th manipulated image, each of which corresponds to each of the first target region to the n-th target region, from the training image or its resized images, and (iii) generating an integrated training image by concatenating the first manipulated image to the n-th manipulated image, (II) (i) instructing one or more convolutional layers to generate at least one integrated feature map by applying one or more convolution operations to the integrated training image, (ii) instructing an RPN to generate each of first object proposals to n-th object proposals, corresponding to the target objects, in each of the first manipulated image to the n-th manipulated image, by using the integrated feature map, (iii) instructing a pooling layer to apply one or more pooling operations to each region, corresponding to each of the first object proposals to the n-th object proposals, on the integrated feature map, to thereby generate at least one pooled integrated feature map, and (iv) instructing an FC layer to apply at least one fully connected operation to the pooled integrated feature map, to thereby generate first object detection information to n-th object detection information corresponding to the target objects, and (III) (i) instructing the target object merging network to generate merged object proposals by merging the first object proposals to the n-th object proposals, and generate merged object detection information by merging the first object detection information to the n-th object detection information, and (ii) instructing an FC loss layer to generate one or more FC losses by referring to the merged object detection information and its corresponding GT, to thereby learn at least part of parameters of the FC layer and the convolutional layers by backpropagating the FC losses.

16. The learning device of claim 15, wherein, at the process of (III), the processor instructs an RPN loss layer to calculate one or more RPN losses by referring to the merged object proposals and their corresponding GTs, to thereby learn parameters of the RPN by backpropagating the RPN losses.

17. The learning device of claim 15, wherein, at the process of (I), the processor instructs the image-manipulating network to adjust at least one of widths and lengths of the first manipulated image to the n-th manipulated image to be identical, and concatenates the first adjusted manipulated image to the n-th adjusted manipulated image in a direction of the widths or the lengths which are adjusted to be identical.

18. The learning device of claim 17, wherein, the processor instructs the image-manipulating network to add at least one zero padding region in-between each pair comprised of two neighboring adjusted manipulated images which are concatenated, among the first adjusted manipulated image to the n-th adjusted manipulated image.

19. The learning device of claim 18, wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as $S \times (K-1)/2$.

20. The learning device of claim 15, wherein, at the process of (III), supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the processor instructs the target object merging network to determine whether an IOU between the first specific object proposal and the second specific object proposal is equal to or greater than a first threshold, then (i) if the IOU is determined as less than the first threshold, calculates an adjusted IOU between an area, corresponding to the first specific object proposal, on the second specific manipulated image and an area, corresponding to the second specific object proposal, on the first specific manipulated image, and (ii) if the adjusted IOU is determined as equal to or greater than a second threshold, selects one of a higher probability among the first specific object proposal and the second specific object proposal, or one of a larger area calculated on the training image among the first specific object proposal and the second specific object proposal, to thereby output the selected one as a specific merged object proposal corresponding to the specific identical object, wherein the IOU is an intersection over union.

21. The learning device of claim 15, wherein, at the process of (III), supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the processor instructs the target object merging network to determine whether an IOU between the first specific object bounding box and the second specific object bounding box is equal to or greater than a first threshold, then (i) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (ii) if the adjusted IOU is determined as equal to or greater than a second threshold, selects one of a higher probability among the first specific object bounding box and the second specific object bounding box, or one of a larger area calculated on the training image among the first specific object bounding box and the second specific object bounding box, to thereby output the selected one as a specific merged object detection information corresponding to the specific identical object, wherein the IOU is an intersection over union.

22. A testing device for testing an object detector based on a CNN using an image concatenation and a target object merging network, comprising:
at least one memory that stores instructions; and
at least one processor, on condition that a learning device (i) has instructed a target region estimating network to search for a first target region for training to an n-th target region for training on at least one training image or its one or more resized images, wherein one or more corresponding target objects for training are estimated as located on each of the first target region for training to the n-th target region for training, (ii) has instructed an image-manipulating network to generate a first manipulated image for training to an n-th manipulated image for training, each of which corresponds to each of the first target region for training to the n-th target region for training, from the training image or its resized images, and (iii) has generated an integrated training image by concatenating the first manipulated image for training to the n-th manipulated image for training, (2) (i) has instructed one or more convolutional layers to generate at least one integrated feature map for training by applying one or more convolution operations to the integrated training image, (ii) has instructed an RPN to generate each of first object proposals for training to n-th object proposals for training, corresponding to the target objects for training, in each of the first manipulated image for training to the n-th manipulated image for training, by using the integrated feature map for training, (iii) has instructed a pooling layer to apply one or more pooling operations to each region, corresponding to each of the first object proposals for training to the n-th object proposals for training, on the integrated feature map for training, to thereby generate at least one pooled integrated feature map for training, and (iv) has instructed an FC layer to apply at least one fully connected operation to the pooled integrated feature map for training, to thereby generate first object detection information for training to n-th object detection information for training corresponding to the target objects for training, and (3) (i) has instructed the target object merging network to generate merged object proposals for training by merging the first object proposals for training to the n-th object proposals for training, and generate merged object detection information for training by merging the first object detection information for training to the n-th object detection information for training, and (ii) has instructed an FC loss layer to generate one or more FC losses by referring to the merged object detection information for training and its corresponding GT, to thereby learn at least part of parameters of the FC layer and the convolutional layers by backpropagating the FC losses; configured to execute the instructions to: perform processes of (I) (i) instructing the target region estimating network to search for a first target region for testing to an n-th target region for testing on at least one test image or its one or more resized images, wherein one or more corresponding target objects for testing are estimated as located on each of the first target region for testing to the n-th target region for testing, (ii) instructing the image-manipulating network to generate a first manipulated image for testing to an n-th manipulated image for testing, each of which corresponds to each of the first target region for testing to the n-th target region for testing, from the test image or its resized images and (iii) generating an integrated test image by concatenating the first manipulated image for testing to the n-th manipulated image for testing, (II) (i) instructing the convolutional layers to generate at least one integrated feature map for testing by applying the convolution operations to the integrated test image, (ii) instructing the RPN to generate each of first object proposals for testing to n-th object proposals for testing, corresponding to the target objects for testing, in each of the first manipulated image for testing to the n-th manipulated image for testing, by using the integrated feature map for testing, (iii) instructing the pooling layer to apply the pooling operations to each region, corresponding to each of the first object proposals for testing to the n-th object proposals for testing, on the integrated feature map for testing, to thereby generate at least one pooled integrated feature map for testing, and (iv) instructing the FC layer to apply the fully connected operation to the pooled integrated feature map for testing, to thereby generate first object detection information for testing to n-th object detection information for testing corresponding to the target objects for testing, and (III) (i) instructing the target object merging network to generate merged object proposals for testing by merging the first object proposals for testing to the n-th object proposals for testing, and generate merged object detection information for testing by merging the first object detection information for testing to the n-th object detection information for testing.

23. The testing device of claim 22, wherein, at the process of (3), the learning device instructs an RPN loss layer to calculate one or more RPN losses by referring to the merged object proposals and their corresponding GTs, to thereby learn parameters of the RPN by backpropagating the RPN losses.

24. The testing device of claim 22, wherein, at the process of (I), the processor instructs the image-manipulating network to adjust at least one of widths and lengths of the first manipulated image for testing to the n-th manipulated image for testing to be identical, and concatenates the first adjusted manipulated image for testing to the n-th adjusted manipulated image for testing in a direction of the widths or the lengths which are adjusted to be identical.

25. The testing device of claim 24, wherein, the processor instructs the image-manipulating network to add at least one zero padding region in-between each pair comprised of two neighboring adjusted manipulated images for testing which are concatenated, among the first adjusted manipulated image for testing to the n-th adjusted manipulated image for testing.

26. The testing device of claim 25, wherein the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as $S \times (K-1)/2$.

27. The testing device of claim 22, wherein, at the process of (III), supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing, the processor instructs the target object merging network to determine whether an IOU for testing between the first specific object proposal for testing and the second specific object proposal for testing is equal to or greater than a first threshold, then (i) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (ii) if the adjusted IOU for testing is determined as equal to or greater than a second threshold, selects one of a higher probability among the first specific object proposal for testing and the second specific object proposal for testing, or one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

28. The testing device of claim 22, wherein, at the process of (III), supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing, the processor instructs the target object merging network to determine whether an IOU for testing between the first specific object bounding box for testing and the second specific object bounding box for testing is equal to or greater than a first threshold, then (i) if the IOU for testing is determined as less than the first threshold, calculates an adjusted IOU for testing between an area, corresponding to the first specific object bounding box, on the second specific manipulated image for testing and an area, corresponding to the second specific object bounding box for testing, on the first specific manipulated image for testing, and (ii) if the adjusted IOU for testing is determined as equal to or greater than a second threshold, selects one of a higher probability among the first specific object bounding box for testing and the second specific object bounding box for testing, or one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

* * * * *